Oct. 23, 1962    W. BADER ET AL    3,059,316
TOOL HOLDER
Filed July 7, 1958
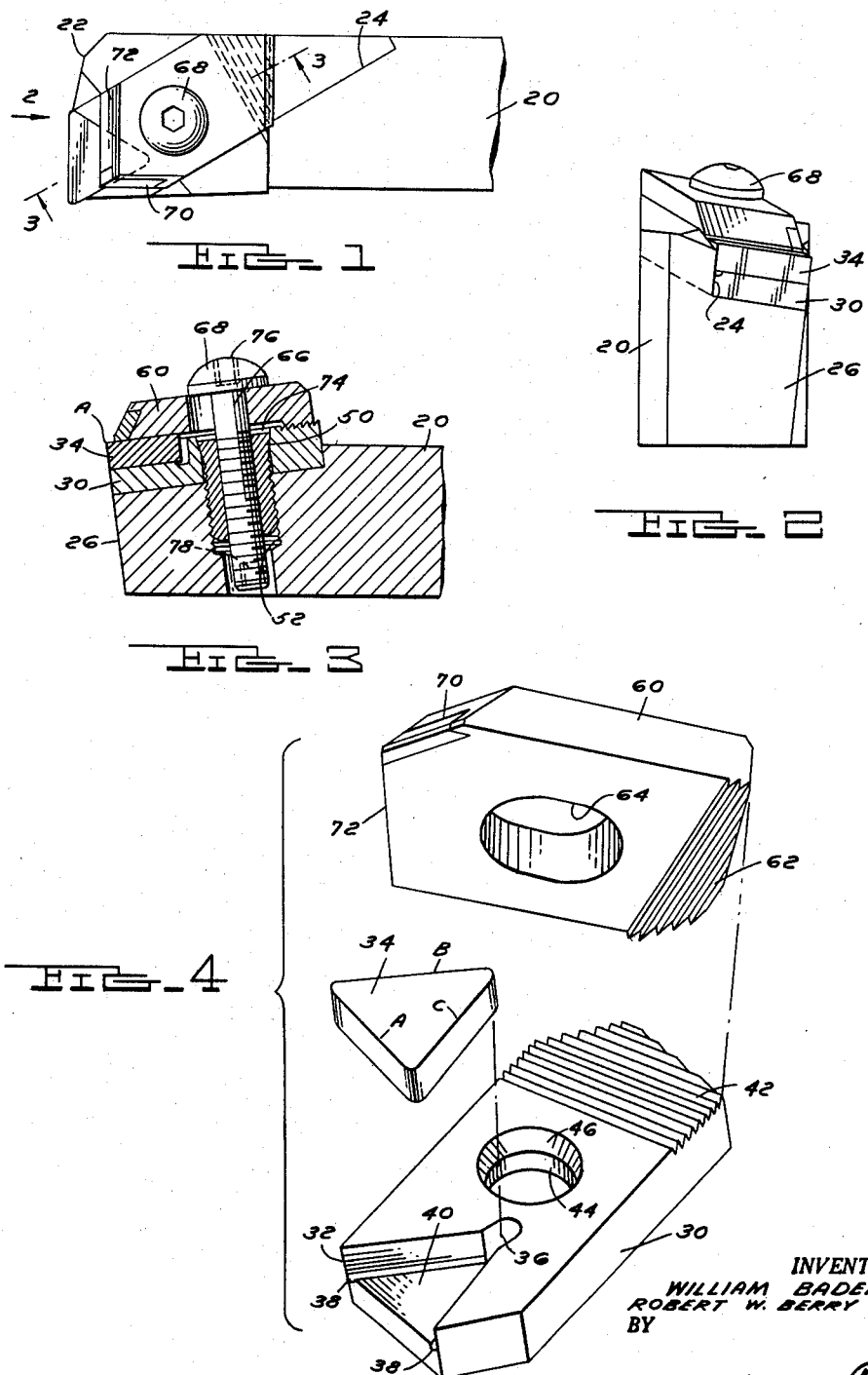
INVENTORS
WILLIAM BADER
ROBERT W. BERRY JR.
BY
Barnes, Kisselle, Raisch & Choate
ATTORNEYS ＃ 3,059,316
TOOL HOLDER
William Bader and Robert W. Berry, Jr., Ferndale, Mich., assignors to Wesson Corporation, Ferndale, Mich., a corporation of Delaware
Filed July 7, 1958, Ser. No. 746,882
1 Claim. (Cl. 29—96)

This invention relates to a carbide insert tool holder.

This application is a continuation-in-part of our copending application, Serial No. 489,914, filed February 23, 1955, now abandoned.

Tool holders for cutting metal inserts have been utilized for many years. As an example, the Bailey Patent 93,580, dated August 10, 1869, shows a tool holder with a band-type clamping means for a bit which is held in the end of the shank in a recess provided therefor. Since the advent of tungsten carbide as a cutting material, there has been an increasing tendency to provide means for holding carbide pieces in tool holders. In some cases small pieces of carbide have been brazed directly to a steel shank. In other cases, large pieces of carbide have been held by mechanical means in a tool holder with an adjustment provided so that the carbide may be reground and re-positioned.

In recent years there has been a trend to devices for holding what is referred to as "throw away inserts," that is, small pieces or pellets of carbide which have several cutting edges around the periphery and which may be indexed to several positions in the holder, using the several cutting edges, and then disposed of, it being cheaper to throw away the insert than attempting to re-grind it.

The present invention contemplates a novel means for holding the pellet or "throw-away" type of carbide insert. It is essential, of course, that these pellets be held firmly in a tool holder and essential also that they can be easily removed so that they may be replaced or indexed.

It is an object to provide a relatively simple type of holder which has the advantage of an expensive construction, simplicity of operation, and which secures the cutting member firmly on the shank.

It is a further object of the invention to provide in some embodiments thereof a movable chip-breaking device which serves not only as a chip breaker but also as a clamp, making it unnecessary to grind the particular insert with a chip breaking curve, as has been done in the past on certain carbide inserts.

Briefly, the invention consists of a steel shank or tool holder having a recess for receiving a pellet cartridge comprising a means for locating the insert pellet transversely and a means for locating the pellet axially or in the direction of the cutting forces.

Drawings accompany the disclosure, and the various views thereof may be briefly described as:

FIGURE 1, a plan view of one modification of the invention.

FIGURE 2, an end view of the assembly taken on line 2 of FIGURE 1.

FIGURE 3, a sectional view of the assembly taken on line 3—3 of FIGURE 1.

FIGURE 4, a perspective exploded view showing the relationship of the various parts.

Referring to the drawings, in FIGURE 1 a tool shank 20 is shown with a head end 22 provided with a top surface recess 24 extending from one corner of the shank back through the top surface to a side surface. The forward end 26 of the tool shank is cut away to provide a clearance angle. Lying in the recess 24 is a shoe anvil or tray 30 shaped to extend in width across the recess 24 and having a greater longitudinal dimension than its width. In the forward end of the tray 30 is a recess 32 for receiving and embracing side walls of a triangular insert 34 made of tungsten carbide or a similar hard cutting material.

In the particular embodiment of the drawings, this insert is triangular in shape, having cutting edges A, B and C on the top surface and similar cutting edges on the bottom surface. The recess is provided with a relief port 36 at the back corner and also relief grooves 38 at the bottom corners extending along the sides to insure a close fit of the pellet on the platform 40. At the rear top surface of the tray 30 is a serrated portion 42, and between the ends is a hole 44 having a tapered upward portion 46. The anvil 30 is held in the body 20 by a hollow bolt 50 which is threaded in a tapped hole 52. In the shank 20 the bolt has a conical upper section which engages the hole 46 to clamp the anvil 30 tightly against the body 20.

A capping or clamping plate for the device 60 is shown best in FIGURE 4 having a heel portion 62 serrated to mesh the serrations 42 on tray 30. An elongate hole 64 is provided to align with the hole 44, and a bolt 66 threads into the inside of the hollow bolt 50 to clamp the plate 60 tightly in place by means of a head 68. Due to the fact that the hole 64 has a longitudinal dimension and the serrations 42 and 62 permit adjustment, it is possible to shift plate 60 to place chip breaking surfaces 70 and 72 to a proper distance from the cutting edge of the insert. This distance will vary with the particular operator using the tool and also the material which is being cut.

Screw 50 is provided with a slot 74 to permit tightening, and bolt head 68 is provided with an Allen wrench recess 74. The shank of the bolt 66 can also be provided with an Allen head recess 78 so that the device may be operated from the bottom of the shank 20.

The assembly and the operation of the device will be quite apparent to a person skilled in the art. The parts 30 and 60 can be formed of cast steel by a process which is known as "investment casting." With this arrangement, machining is eliminated on these parts and the tool may be produced at an extremely low cost.

It will be seen that the locator member is a replaceable element which can be furnished relatively inexpensively. In FIGURES 1 to 4, the member 30, which serves not only as the locator but as the anvil member, can be easily and quickly replaced.

In addition, it will be seen that the tool holder itself is a relatively simple member with one milled slot and a threaded hole, making it possible to reduce the cost of the element to a minimum.

What is claimed is as follows:

A cutting tool assembly for holding a replaceable, expendable and indexable cutting insert, comprising: a mounting body to serve as a holder in a machine tool and having a flat surface on a small portion thereof angled to lie substantially normal to a required tool clearance angle, a holding member having a flat bottom surface for direct mounting on said flat surface of said body, a pocket opening to one end and the top of said holding member and having a flat bottom parallel to said bottom surface of said holding member, said insert having opposed parallel flat surfaces and side surfaces joining said flat surfaces, said side surfaces defining a plurality of peripherally spaced portions of substantially identical outline, said pocket having side surfaces inwardly of said one end arranged complementary to said spaced peripheral portions of said insert to embrace the same to prevent lateral movement of said insert, said insert being so dimensioned that it may be selectively positioned in said pocket with either flat surface bearing on the bottom of said pocket and any selected one of said spaced peripheral portions embraced by said side surfaces of said pocket, a clamping member mounted on said holding member having a bearing portion disposed and bearing on said holding member and another portion overlying said insert and clamping the same in said pocket, said other portion of said clamping member terminating short of the outer periphery of said insert whereby the outer upper edge thereof is exposed and constitutes a cutting edge, and locking means to clamp said members to each other and to said mounting body, said locking means including an element anchored in said mounting body and clampingly engaging at least one of said members, the holding member and the mounting body being provided with registering holes, and the locking means comprising a hollow screw in said holes threaded into said mounting body to secure the holding member to the body, and a screw transfixing said clamping member anchored in said hollow screw to clamp said clamping member over an insert in said pocket.

References Cited in the file of this patent

UNITED STATES PATENTS

| | | |
|---|---|---|
| 2,400,856 | Thompson | May 21, 1946 |
| 2,425,242 | Herring | Aug. 5, 1947 |
| 2,480,226 | Diebert | Aug. 20, 1949 |
| 2,630,725 | Black | Mar. 10, 1953 |
| 2,734,256 | Forward | Feb. 14, 1956 |
| 2,808,637 | Hudson | Oct. 8, 1957 |
| 2,808,638 | Filippi | Oct. 8, 1957 |
| 2,930,111 | St. Clair | Mar. 29, 1960 |

FOREIGN PATENTS

| | | |
|---|---|---|
| 257,171 | Switzerland | Mar. 16, 1949 |
| 667,676 | Great Britain | Mar. 5, 1952 |